July 26, 1966                L. V. KALTENECKER                3,262,411
                         BARGE BASED PROCESS PLANT
Original Filed Aug. 15, 1962                         4 Sheets-Sheet 1

LESTER V. KALTENECKER
    INVENTOR.

BY J. W. McCloskey
              AGENT

July 26, 1966 L. V. KALTENECKER 3,262,411
BARGE BASED PROCESS PLANT
Original Filed Aug. 15, 1962 4 Sheets-Sheet 2

LESTER V. KALTENECKER
*INVENTOR.*
BY J. W. McCloskey
*AGENT*

July 26, 1966     L. V. KALTENECKER     3,262,411
BARGE BASED PROCESS PLANT

Original Filed Aug. 15, 1962     4 Sheets-Sheet 3

LESTER V. KALTENECKER
*INVENTOR.*

BY J.W. McCloskey
*AGENT*

July 26, 1966 L. V. KALTENECKER 3,262,411
BARGE BASED PROCESS PLANT
Original Filed Aug. 15, 1962 4 Sheets-Sheet 4

LESTER V. KALTENECKER
INVENTOR.

BY J.W. McCloskey
AGENT

United States Patent Office 3,262,411
Patented July 26, 1966

3,262,411
BARGE BASED PROCESS PLANT
Lester V. Kaltenecker, Hollywood, Fla., assignor to Chemical Construction Corporation, New York, N.Y., a corporation of Delaware
Original application Aug. 15, 1962, Ser. No. 217,202. Divided and this application June 2, 1965, Ser. No. 465,245
4 Claims. (Cl. 114—.5)

The present application is a division of application Serial No. 217,202 filed August 15, 1962, and now abandoned.

This invention relates to a process plant installed on a concrete barge whereby the process plant may be partially or completely erected on a concrete barge in one location and then towed to another location where it is intentionally seated so that the barge thereby becomes the foundation for the process plant.

Process plants are often required in locations far removed from areas having the skilled labor, fabricating and manufacturing facilities necessary to construct and erect such plants. The location of an oil refinery, for example, may be determined by the location of the oil which may be in a location far removed from an industrialized area. In other cases it might be desirous to located a process plant at an isolated location where a particular raw material is available in abundance. For example, local deposits of phosphate rock could be treated on barge based process plants to produce phosphate fertilizer compositions. A particularly attractive feature of the invention is that the barge with the installed plant can be raised after it has served its purpose at one site and reseated at another location.

In order to construct and erect these process plants in such isolated areas, it becomes necessary to manufacture the component parts of the plant in an industrialized area and then ship these parts to the installation site for erection. In many cases the transportation and handling problem becomes acute due to inadequate or unavailable transportation and handling facilities in the area where the plant is to be installed. In order to erect the plant, skilled workers and specialized equipment frequently have to be transported to the installation site and remain there during the construction of the plant so that they cannot be used on any other construction jobs. In certain cases the efficiency of the construction may be impaired due to the inability of being able to send sufficient skilled workers or specialized equipment to the site.

If the process plant could, therefore, be manufactured and erected at least partially in an industrial area and then shipped as a completed or nearly completed plant to such a site, then a considerable savings in cost and increase in construction efficiency in building the plant could be achieved. The savings in cost would result from the fact that the necessity of shipping the skilled workers and specialized equipment to the installation site for erection of the plant would be minimized or completely eliminated. Furthermore, the cost of shipping a single assembled plant in many cases would be cheaper than shipping the component parts individually. Also, by erecting the plant in an industrialized area, the entire resources and skills available in such area may be utilized to a maximum and thereby increase the efficency of construction of the plant.

It is therefore an object of the present invention to provide a process plant which may be erected and installed at a reduced cost.

Another object is to provide a process plant which may be manufactured and erected or partially erected on a concrete barge in one area and then shipped to another area as a completed plant or nearly completed plant.

Still another object is to provide a process plant which may be erected or partially erected on a barge in one location and then towed to another location where it is to go into operation.

Yet another object is to provide a process plant installed on a concrete barge whereby the barge may be towed to an installation site and intentionally seated so that it becomes landlocked and serves as the foundation for the process plant.

A further object is to provide a portable process plant installed on a concrete barge which may be towed, seated and raised at various installation sites.

The aforesaid objects of the present invention and other objects will become apparent as the description proceeds. For a better understanding of the present invention reference should be had to the accompanying drawings, wherein like numerals of reference indicate similar parts throughout the several views and wherein.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed is for the purpose of description and not of limitation.

Figure 1:
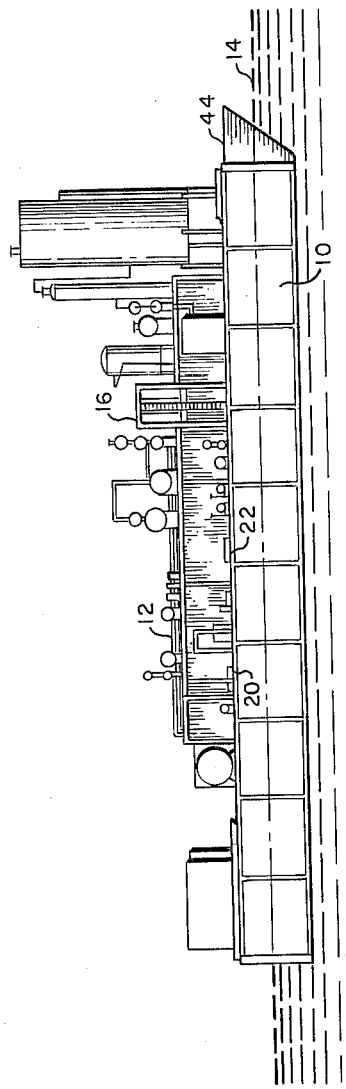
FIG. 1 is a side view of a barge and a partially completed process plant installed thereon.
Figure 3:
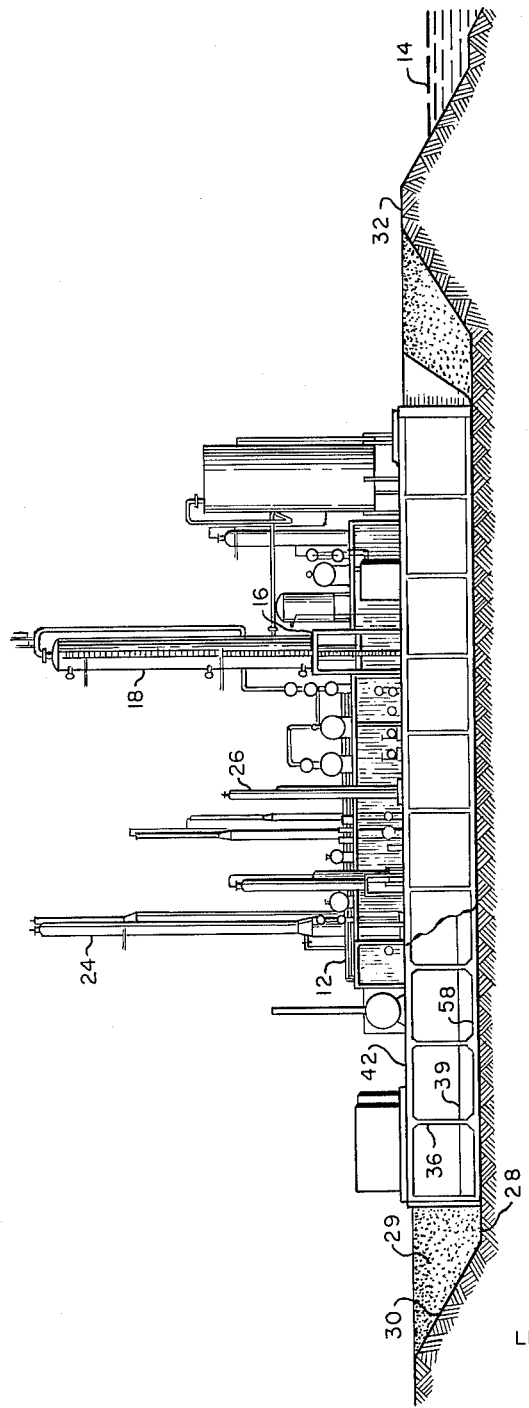
FIG. 3 is a side view partially in section of the barge and complete process plant at an installation site.

With specific reference to the form of the present invention illustrated in the drawings and referring particularly to FIG. 1, a barge 10 carrying a partially erected process plant indicated generally at 12 is shown floating on a body of water 14. FIG. 1 shows the barge 10 and process plant 12 as it might appear when being towed to an installation site. In this case, the plant 12 is towed partially erected with the final components being installed in place at the installation site where the plant is to go into operation. FIG. 3 shows the barge 10 and completed process plant 12 at an installation site. Where desired and where feasible, the plant 12 may be towed to the installation site as a completed plant ready to operate.

The process plant 12 may be towed in a partially erected condition for several reasons. The component parts of the process plant may include rather tall towers or vessels such as, for example, fractional distillation towers used in oil refineries so that such towers would tend to raise the center of gravity of the plant-barge unit to reduce its stability. Also high winds, encountered while the barge 10 is being towed, acting on these tall towers would tend to increase the degree of roll and pitch and thereby affect the barge stability. Also, undesirous effects are experienced by the towers due to the fact that the force of the wind would act on rather large moment arms defined by the height of the towers. Also undue strains are imparted to such tall towers when the barge starts to roll and pitch while it is being towed. Prohibitive costs result, relative to site erection, to reinforce towers and anchorage requirements to increase resistance against gravity and lateral forces resulting from the roll and pitch of the barge during the tow. Lack of available deck space precludes efficient use of guys and struts to stay towers and increases costs to transfer shears and moments through deck to compartment walls.

To avoid these problems, the relatively tall component parts, if any, of the process plant may be shipped in a horizontal position on the barge 10 or shipped separately for erection at the installation site. As an example of this feature; supports, such as a base 16, as shown in FIG. 1, may be provided during construction of the barge and process plant in order that the tower 18, FIG. 3, may be installed on the support 16 after the barge has arrived at the installation site. Various other base members such as 20 and 22 are shown in FIG. 1 for supporting the towers 24 and 26 respectively, FIG. 3, the towers being installed on these bases at the installation site. It is also often desirable to have on the barge a self-erecting pole to be used to erect tall towers at the site where erection equipment as cranes are unavailable.

Figure 2:
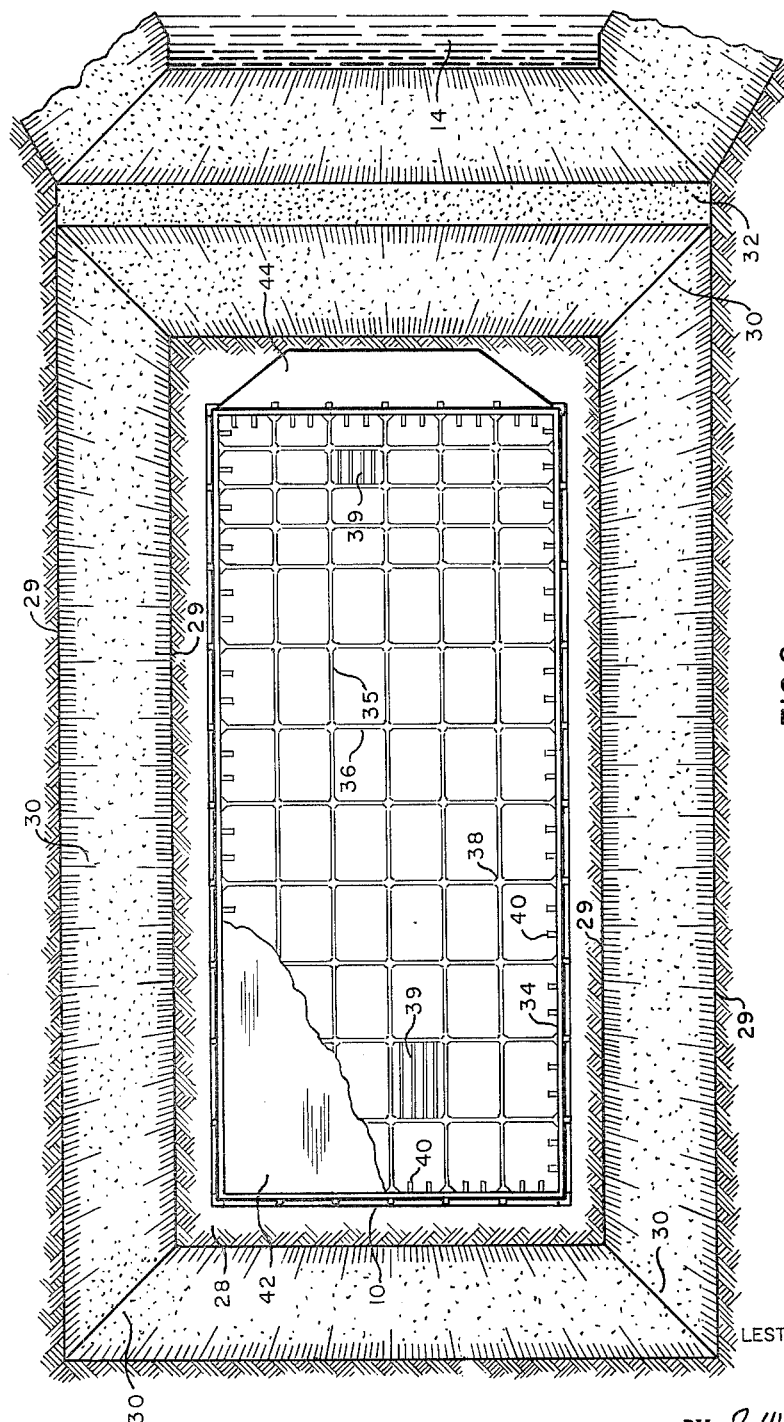
FIG. 2 is a plan view of the barge partially in section showing the land area adjacent to the barge at an installation site.

At the installation site the barge 10 is intentionally seated at a predetermined location so that it will rest on solid ground to provide the firm foundation for the process plant 12. The barge 10 may be, for example, floated in at high tide to an area adjacent to the shore line and moored there until seated as the tide goes out, after which such area, or a portion of the area around the barge, is filled in by means of sand bags or earth moving equipment to prevent the tide from coming in and refloating the barge. In some cases it may be desirable to provide a specially constructed seating area for the barge such as shown in FIGURES 2 and 3. In FIG. 3 the barge 10 is shown with its bottom resting on the levelled portion 28 of a channel 29 which has been specially prepared for receiving the barge. Depending on the nature and condition of the soil, the levelled portion 28 may be compacted or stabilized to rearrange the soil particles into a dense mass and thereby provide a firm support. The sides of the channel 29 may be formed of sloping side walls 30.

The elevation of the levelled portion 28 relative to the level of the body of water 14 is such that the barge 10 may be floated into position over the levelled portion 28 and made to come to rest thereon by causing or allowing the water in the channel 29 to be removed therefrom. This may be accomplished by building a dike or dam 32 across the channel 29, after the barge 10 is floated into position over the levelled portion 28, to separate the body of water 14 from the water in the channel 29 and thereby isolate the barge 10 from the body of water 14. After the barge has been seated, the portion of the channel 29 not occupied by the barge 10 may then be filled in with earth or other material so that the barge 10 becomes landlocked. The water around the barge 10 may be displaced to run into the body of water 14 by pumping or if the barge 10 is floated into the channel 29 at high tide, means may be provided for draining or pumping the channel 29 into the body of water 14 at low tide.

The barge 10, which is constructed of reinforced concrete is made up of a hull 34 having numerous longitudinal and transverse walls such as 35 and 36 respectively, defining compartments therein. These concrete walls 35, 36, running throughout the length and breadth of the hull 34 are essential for rigidity and strength and provide watertight compartments in the barge. The size of the compartments may vary for different portions of the barge and are provided to increase the strength and rigidity in areas requiring it whether it be for the purposes of increasing seaworthiness, resistance to launching forces, or site foundation conditions; such as, for example, by providing smaller and a greater number of compartments in the bow or forward area of the barge, as shown in FIG. 2, or whether it be to provide increased support for a particular component part of the process plant 12.

The hull 34, deck 42 and compartment walls 35, 36 are formed as an integral concrete unit. Additional concrete may be provided at the intersections of the various concrete walls and top and bottom of hull such as indicated by the numeral 38 in FIG. 2, to provide additional strength and rigidity. Concrete stiffening ribs may be provided wherever deemed necessary such as the upright ribs 39 extending from the bottom of the hull 58, or the ribs 40 extending inwardly from the side of the hull. In FIG. 2 the upright ribs 39 are shown in two of the compartments. However, it is to be understood that the illustration of only two thus reinforced compartments is merely to simplify the figure. It is preferred, although not absolutely necessary, that all compartments be reinforced with the ribs 39. These ribs 39 can be present or absent depending on design conditions and economy. The top portion of the hull is provided with an integral concrete deck 42 upon or through which the process plant is mounted.

The barge 10 can be provided with a prow 44 which may be made of concrete and provided wtih stiffening ribs so that it can adequately withstand the forces of the water acting thereon as it is being towed. Alternatively, the prow 44 may also be formed of other materials such as steel or timber and attached to the front of the concrete barge 10. The use of materials other than concrete must be such as to provide a strong prow able to adequately withstand the forces brought thereon by the sea when eliminating or minimizing extensive bracing members within the prow. The prow 44 may have holes therein to allow water to freely enter and exit therefrom or it may be completely sealed and filled with a filler such as sand or water, or it may be allowed to remain empty. The shape of the prow 44 may be triangular as shown in FIG. 3 or it may have any other suitable configuration. In some instances it has been found that the prow need not be installed for towing because at slow towing speeds the flat face of the forward end of the barge will not unduly hinder the movement of the barge. After the prow has served its purpose it can be removed before or after the barge has been seated at the plant site.

In order to reinforce the concrete barge 10 against the launching and oceantow forces, means such as post tensioned cables, which are known per se, may be used. In using this type of reinforcement, conduits are supported in position as the concrete for the barge is poured. Positioned inside the conduits are cables which are adapted to be stressed after the concrete has sufficiently hardened. These cables may be stressed by hydraulic jacks and after they have reached the desired stress and elongation, the post tensioned cables are secured in cone-shaped anchors which are caused to be anchored against the concrete through wedge action of the cone-shaped anchors and friction with the reinforcement. The conduits containing the post tensioned cables are then pressure filled with grouting material.

Figure 5:
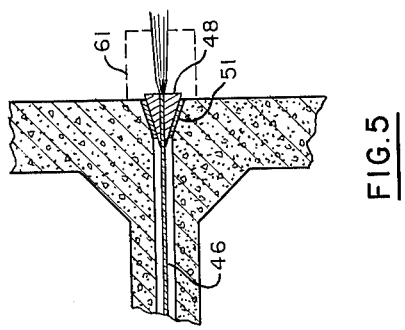
FIG. 5 is a schematic view showing the means for securing the post tensioned reinforcing cables.

FIG. 5 shows schematically one method of anchoring post tensioned cables and shows a cable 46 securely held by a cone-shaped member 48. A female socket member 51 may be provided so that the tension of the cable 46 is transmitted through the cone 48 to the female socket 51 to the concrete. The cable 46 may be secured to the cone 48 by known means such as by separating the strands at the end of the cable 46 and filling the spaces therebetween with molten metal which hardens to form a secure connection. Anchored ends of cable are protected against corrosion by embedment in reinforced concrete ribs 61 shown in FIG. 5 by dotted lines. It is to be understood that the portion of the cable strands projecting beyond the dotted outline of ribs 61 will be cut off or folded over before the concrete rib is poured.

Figure 4:
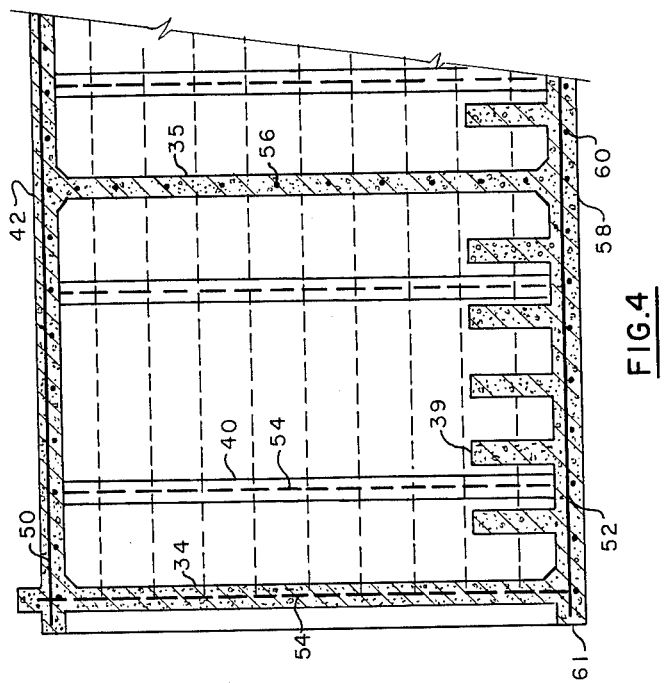
FIG. 4 is a partial end view in section of a portion of the concrete barge.

The details of the means for securing the ends of the post tensioned cables are not shown in FIG. 4 since this is shown schematically in FIG. 5. The post tensioned cables extend through the hull ribs 40, the deck 42, the bottom 58 and the compartment walls in longitudinal and transverse directions. Cables 50 and 52 are examples of transverse cables, while cables 54 are examples of vertical cables. A longitudinal cable 56 is shown in cross-section in FIG. 4. Individual walls defining the hull 34, deck 42 and compartments 35, 36 may be provided with cables running in more than one direction. For example, the slab 58 defining the bottom of the hull 34 has cables 52 and 60 running in a transverse and longitudinal direction respectively. The cables are arranged similarly in the deck 42. Various arrangements of the cables may be used for reinforcing the concrete barge as may be found to be suitable.

The barge 10 is adapted to serve as a means for transporting a process plant 12 and as the foundation for the plant at an installation site. The barge 10 may be seated and used at one installation site for a period of time and later removed therefrom and towed to a different installation site so that it is in effect a portable unit. To overcome the effect of buoyancy in the seated position and to facilitate refloating seated barge, the compartments are filled with water. Other suitable materials, ballast such as hydraulic fill, can also be used. When it is necessary to remove the barge based plant to another location the barge can be refloated by pumping out the water or by removing the fill.

The types of process plants that may be installed on the barge may vary over a wide range and the plant 12 may have varying sizes and complexities of component parts, but for the purposes of indicating the types of plants that may be installed on the barge, the following are listed as representative: oil refineries, sulfuric acid plants, ammonia plants, water treatment plants, fertilizer plants, and the like. This invention is particularly adaptable for salt water conversion plants in which the compartments in the barge could be used for storage of purified water.

The invention hereinabove described may be varied in construction within the scope of the claims, for the particular device selected to illustrate the invention is but one of many possible embodiments of the same. The invention, therefore, is not to be restricted to the precise details of the structure shown and described.

I claim:
1. A portable chemical process plant such as an oil refinery and the like, with integral foundation for marine transport and support at a land site, comprising a generally rectangular concrete barge having a longitudinal dimension longer than its transverse dimension, a horizontal concrete deck extending across the top of said barge, a process plant disposed and supported on said deck, a first plurality of parallel spaced apart vertical concrete walls, said first plurality of walls extending longitudinally within said barge and between said deck and the bottom of said barge, a second plurality of parallel spaced apart vertical concrete walls, said second plurality of walls extending transversely within said barge and between said deck and the bottom of said barge, whereby said first and second plurality of walls provide integral support for said process plant, a plurality of integral post tensioned cables, said cables extending through at least one of the concrete apparatus elements comprising said deck, the outer walls and bottom of said barge, and said first and second plurality of walls, said cables being under tension in service whereby said cables provide a compressive reinforcing effect on said concrete apparatus elements through which said cables are extended, a plurality of terminal conical anchors, each of said anchors being attached to one end of one of said cables with the cable ends extending axially through said anchors and the apex of each of said anchors facing towards the cable to which said anchor is attached, and a plurality of hollow conical sockets, each of said sockets being disposed between one of said anchors and the respective concrete apparatus element, whereby the tension of each of said cables exerts a compressive force on the respective concrete apparatus element through terminal conical anchors and sockets.

2. A portable chemical process plant such as an oil refinery and the like, with integral foundation for marine transport and support at a land site, comprising a generally rectangular concrete barge having a longitudinal dimension longer than its transverse dimension, a horizontal concrete deck extending across the top of said barge, a process plant disposed and supported on said deck, a first plurality of parallel spaced apart vertical concrete walls, said first plurality of walls extending longitudinally within said barge and between said deck and the bottom of said barge, a second plurality of parallel spaced apart vertical concrete walls, said second plurality of walls extending transversely within said barge and between said deck and the bottom of said barge, with the spacing between said second plurality of walls being decreased over at least one portion of said barge, whereby said first and second plurality of walls provide integral support for said process plant and accommodate for varying stress applied to different portions of said barge, a plurality of integral post tensioned cables, said cables extending through at least one of the concrete apparatus elements comprising said deck, the outer walls and bottom of said barge, and said first and second plurality of walls, said cables being under tension in service whereby said cables provide a compressive reinforcing effect on said concrete apparatus elements through which said cables are extended, a plurality of terminal conical anchors, each of said anchors being attached to one end of one of said cables with the cable ends extending axially through said anchors and the apex of each of said anchors facing towards the cable to which said anchor is attached, and a plurality of hollow conical sockets, each of said sockets being disposed between one of said anchors and the respective concrete apparatus element, whereby the tension of each of said cables exerts a compressive force on the respective concrete apparatus element through terminal conical anchors and sockets.

3. The apparatus of claim 2, in which the spacing between said second plurality of walls is decreased adjacent to one end of said barge.

4. The apparatus of claim 2, combined with a prow, said prow extending outwards from one end of said barge to provide streamline effects and thereby minimize resistance of the barge to towing during marine transport, said decreased spacing between said second plurality of walls being provided at the end of said barge adjacent to said prow.

References Cited by the Examiner

UNITED STATES PATENTS

| | | | |
|---|---|---|---|
| 1,829,304 | 10/1931 | Schroeder. | |
| 2,371,964 | 3/1945 | Lee | 114—65 |
| 2,545,403 | 11/1948 | Palmieri | 114—65 |
| 2,995,015 | 8/1961 | Phelps. | |
| 3,091,089 | 5/1963 | Gellerstad | 61—46 |
| 3,091,203 | 5/1963 | USAB | 114—0.5 |
| 3,128,737 | 4/1964 | USAB | 114—0.5 |
| 3,161,492 | 12/1964 | Keith et al. | 61—46.5 |

FOREIGN PATENTS 415,603   8/1934   Great Britain.

MILTON BUCHLER, *Primary Examiner.*

T. M. BLIX, *Assistant Examiner.*